United States Patent
Orimoto et al.

(10) Patent No.: US 11,428,333 B2
(45) Date of Patent: Aug. 30, 2022

(54) VALVE APPARATUS AND FLUID PRESSURE SYSTEM EQUIPPED THEREWITH

(71) Applicant: Caterpillar SARL, Geneva (CH)

(72) Inventors: Shuhei Orimoto, Akashi (JP); Koichi Kiyasu, Akashi (JP)

(73) Assignee: Caterpillar SARL, Geneva (CH)

( * ) Notice: Subject to any disclaimer, the term of this patent is extended or adjusted under 35 U.S.C. 154(b) by 749 days.

(21) Appl. No.: 16/317,872

(22) PCT Filed: Jul. 22, 2017

(86) PCT No.: PCT/EP2017/068562
§ 371 (c)(1),
(2) Date: Jan. 15, 2019

(87) PCT Pub. No.: WO2018/019741
PCT Pub. Date: Feb. 1, 2018

(65) Prior Publication Data
US 2021/0285554 A1 Sep. 16, 2021

(30) Foreign Application Priority Data
Jul. 28, 2016 (JP) .............................. JP2016-148843

(51) Int. Cl.
*F16K 11/07* (2006.01)
*E02F 9/22* (2006.01)

(52) U.S. Cl.
CPC ......... *F16K 11/0716* (2013.01); *E02F 9/2282* (2013.01); *F15B 2211/3116* (2013.01); *F15B 2211/7142* (2013.01)

(58) Field of Classification Search
USPC .......................................... 60/421
See application file for complete search history.

(56) References Cited

U.S. PATENT DOCUMENTS

2004/0154674 A1* 8/2004 Pieper ............... F15B 13/0814
137/884

FOREIGN PATENT DOCUMENTS

CN 101196199 B 3/2013
JP S58-042803 A 3/1983
(Continued)

OTHER PUBLICATIONS

International Search Report for related International Application No. PCT/EP2017/068562; report dated Oct. 19, 2017.

*Primary Examiner* — Thomas E Lazo
*Assistant Examiner* — Daniel S Collins

(57) ABSTRACT

It is to provide a control valve that can make the valve body smaller and the structure simplified and the hydraulic pressure system equipped therewith. The plural number of parallel feeder oil paths that are respectively connected to the plural number of pumps and are not cut off by displacement of spools is provided in the valve body in a linearly through all spool holes. For each section, a connection oil path is provided to connect any one side of parallel feeder oil paths to the bridge circuit B of the internal spools. Parallel feeder oil paths can be positioned in a simple shape, but also, just by properly providing connection oil paths, without depending on each section belonging to any of pump systems, positioning of section can be freely done within the valve body. Making the valve body smaller and the structure simplification can be executed.

6 Claims, 3 Drawing Sheets

(56) References Cited

FOREIGN PATENT DOCUMENTS

| JP | 2007-501914 A | 2/2007 |
|---|---|---|
| WO | WO 2015/119175 A1 | 8/2015 |

* cited by examiner

VALVE APPARATUS AND FLUID PRESSURE SYSTEM EQUIPPED THEREWITH

CROSS-REFERENCE TO RELATED APPLICATION

This Application is a 35 USC § 371 US National Stage filing of International Application No. PCT/EP2017/068562 filed on Jul. 22, 2017 which claims priority under the Paris Convention to Japanese Patent Application No, 2016-148843 filed on Jul. 28, 2016.

TECHNICAL FIELD

The present invention relates to a valve apparatus that feeds working fluid to the actuator in response to the operation of the operation unit and the fluid pressure system equipped therewith.

BACKGROUND TECHNOLOGY

Conventionally, for instance as a hydraulic system as the fluid pressure system used for work machinery such as hydraulic excavators and the like, there are those that have center bypass circuits and detect negative flow control pressure of the center bypass circuit using the so-called open center type control valves, and based on the detected negative flow control pressure, engage in pump control (negative control). Regarding the hydraulic system that uses this negative control, that the system is in the non-load condition that does not drive the actuator is detected by the rise of negative flow control pressure of the center bypass circuit, and by decreasing the pump discharge flow amount in a non-load condition, energy saving is planned (for instance, refer to Patent Literature 1).

Regarding the control valve described in the Patent Literature 1 described above used for this hydraulic system, in addition to the center bypass circuit for the control valves as the hydraulic flow path that is fed from pumps, flow paths (parallel feeder circuit) to feed pressure oil to the actuator via each valve section are provided, because of this, there are issues such that one could not avoid making the apparatus larger, and also, the oil path shape of the center bypass circuit is complex, and casting shapes become complex.

Regarding these points, for instance as another pump control method, there is a positive control in which the pump discharge flow amount required from the operation amount of the operation lever operated by an operator is calculated, and based on this, the pumps are controlled. In the hydraulic system that uses this positive control, since the negative flow control pressure detection is not necessary for pump control, it is possible for control valves to use either one of those that has a center bypass circuit or those which do not have it.

Moreover, for the hydraulic system used for work machinery such as a hydraulic excavator, many times the plural number of hydraulic pumps are used, and in this case, each actuator is distributed to either one side of the hydraulic pump circuits in response to each usage frequency and the flow amount that becomes necessary for drive, such that basically for instance, using one side of pumps, a boom, a bucket and one side of right or left run motor are driven, and using other side of the pumps, the arm, rotation and one of left or right run motors are driven. Hence, in the entire control valve unit, regarding each valve section that controls the pressure oil amount to each actuator, it is necessary to be positioned by separately dividing into the hydraulic pump circuit side to which the actuator belongs.

At this time, to provide for instance an already known boom merger circuit (a circuit in which in order to increase boom-up speed, with respect to the boom-up oil path connected to one side of pumps, pressure oil of other pump side is merged), it is necessary that a long oil path is provided that penetrates the plural number of valve sections directed to the boom section inside the control valve structure (for instance refers to Patent Literature 2 and 3), and in this case, as described above, this results in the factors that invite making the control valve larger and making the cast shape more complex.

Specifically, in the Patent Literature 2 described above, a configuration of hydraulic circuit is described in which the feed path from two pumps go through the entire control valve. In this configuration, feeding the pressure oil of 1 pump portion with respect to the entire section, or feeding by merging the 2 pumps portion of pressure oil can be switched, and since it has the oil path to merge 2 pumps in the entire section, the oil path structure in one section is made very complex.

Moreover, in the Patent Literature 3 described above, the same as the configuration described in the Patent Literature 2 described above, it has a hydraulic circuit configuration that feeds pressure oil from two pumps to one hydraulic system, and a configuration is described in which while feeding the pressure oil to each section is being compensated for by the parallel circuit separately provided from the two pump feed paths, in response to the needs, feeding is enabled by merging 2 pump portion of pressure oil. In this configuration, in the two pump feed paths in each section, one is closed by a plug and it is not that either one of them is selected regarding the pressure oil that is fed via parallel circuit side, but that it is not fed to the actuator by selecting only either one from pressure oil that is fed from two pumps.

PRIOR ART

Patent Literature

[Patent Literature 1] Unexamined Patent Application S59-43204 Gazette
[Patent Literature 2] Unexamined Patent Application S58-42803 Gazette
[Patent Literature 3] Japanese Translation of PCT International Application Publication No. JP-T-2007-501914 Gazette

SUMMARY OF INVENTION

Challenges Invention Attempts to Solve

As described above, a valve apparatus is desired that controls making the valve main body larger and making the structure more complicated.

The present invention was attempted in view of the above points, and the purpose is to provide a Valve Apparatus and Fluid Pressure System Equipped Therewith that makes the valve main body smaller and the structure simplified.

Means to Solve the Challenge

The invention described in claim 1 is a valve apparatus that feeds to the plural number of actuators the working fluid that is discharged from the discharge source of the plural number of systems in response to the operations of the operation unit, and the valve apparatus is equipped with a valve main body; a section equipped with the plural number of spool holes provided in the valve main body in which the spool holes correspond with each actuator, and spools that are provided free to be displaced respectively inside these spool holes, and configures a bridge circuit that controls the flow amount and direction of working fluid that is fed to the actuator in response to the operation of operation unit; parallel feeder paths that are respectively connected to the discharge source and provided in a linearly line to the valve main body through the plural number of spool holes, and is not cut off by spool displacement; and the connection path that connects one of the parallel feeder path for each section to the bridge circuit of the internal spool.

The invention of the claim 2, in the valve apparatus according to claim 1, is equipped with a switching valve that is provided in the valve main body and corresponds to each parallel feeder path such that the switching valve switches so that the parallel feeder path and the tank communicate during non-operation time of the operation unit, and also during the operation of the operation unit, the communication of the parallel feeder path and the tanks are shut off.

The invention of Claim 3 is a fluid pressure system equipped with discharge sources of the plural number of systems, operation units, the plural number of actuators, a valve apparatus described in claim 1 or claim 2, a controller that controls at least the discharge amount of working fluid from the discharge source in response to the operation of the operation unit and operations of the valve apparatus spools.

Effect of Invention

According to the invention in claim 1, the plural number of parallel feeder paths that are connected with the plural number of discharge sources respectively and not cut off by the displacement of spools are provided in the valve main body linearly through the plural number of spool holes, and for each section, any one side of these parallel feeder paths is connected to the internal spool bridge circuit by the connection path, thereby the parallel feeder paths are positioned in a simple shape, and also, just by properly providing connection paths, without depending on each section belonging to any of the discharge source system, section positioning can be freely done within the valve main body. Hence, making the valve main body smaller and its structure simplified is achieved.

According to the invention in claim 2, during the operation of the operation unit, the communication of the parallel feeder paths and tanks is cut off by switching valve, and working fluid pressure is properly raised, and in response to the operation, by displaced spool, working fluid is fed to the actuator for sure thus, the actuator can be properly operated.

According to the invention in claim 3, in response to the operation of the operation unit, by controlling by a controller the discharge amount of the working fluid from the discharge source and the operation of the spool of the valve apparatus, fluid pressure system that enables the plural number of actuator to be operated can be realized as a small type and cheaply.

BRIEF EXPLANATION OF DRAWINGS

[Drawings 1] This is a vertical plan view showing an embodiment of the valve apparatus involving the present invention.

[Drawings 2] This is a vertical side view showing the sane valve apparatus as above.

[Drawings 3] This is a circuit drawings showing fluid pressure system equipped with the same valve apparatus as above.

FORM TO EMBODY INVENTION

Figure 1:
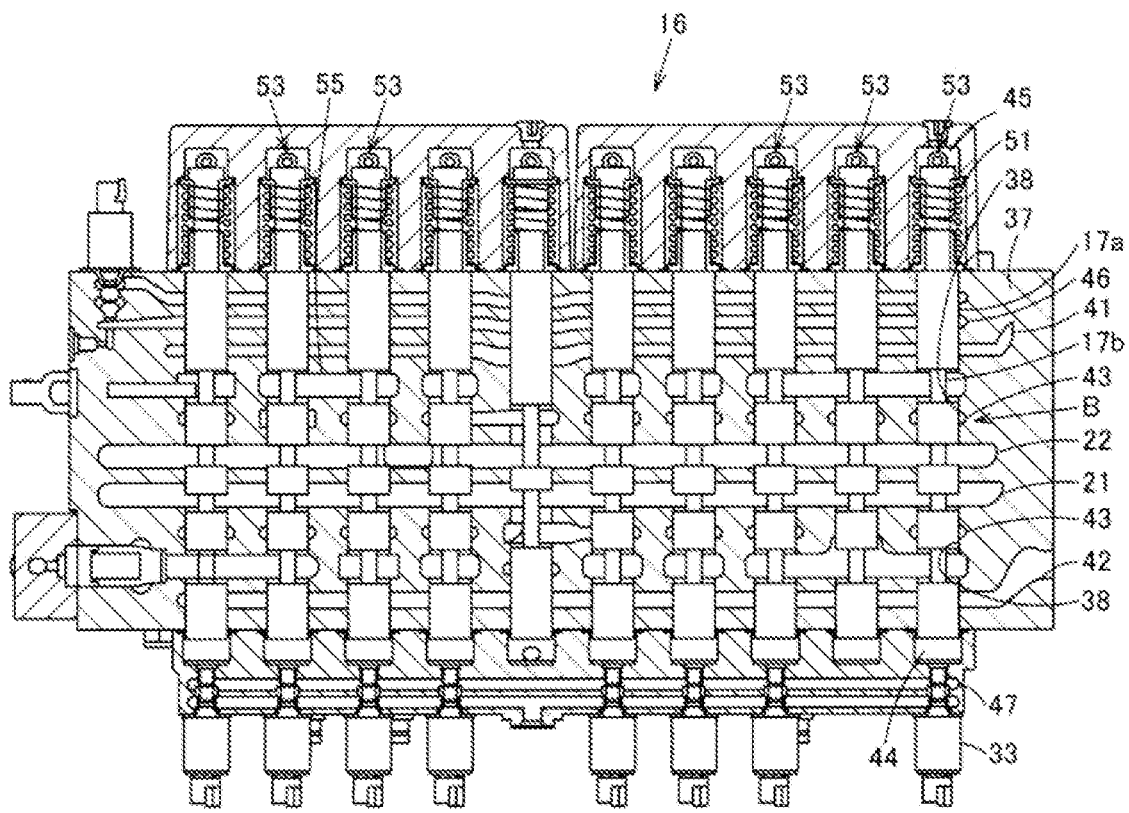
Figure 2:
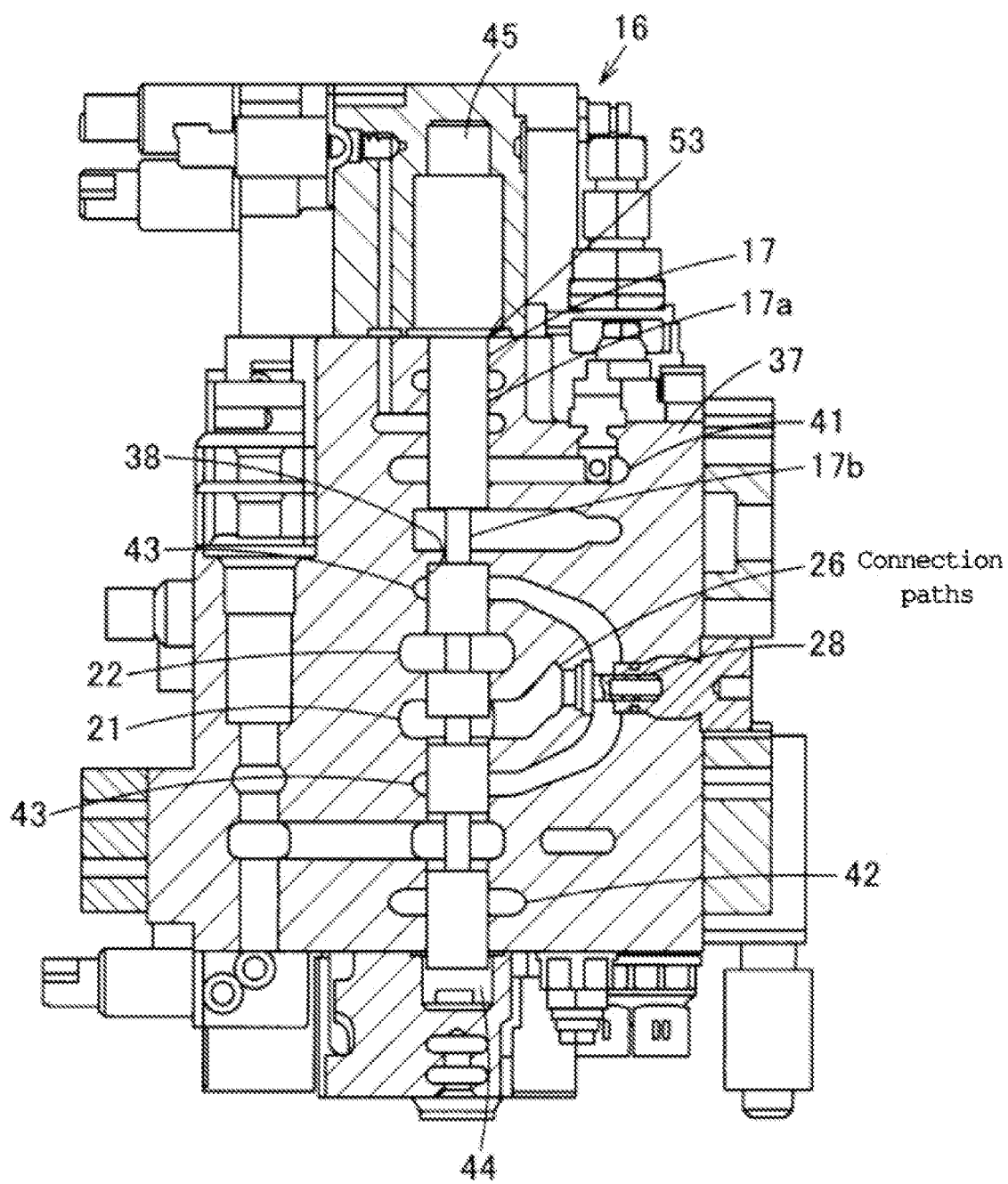
Figure 3:
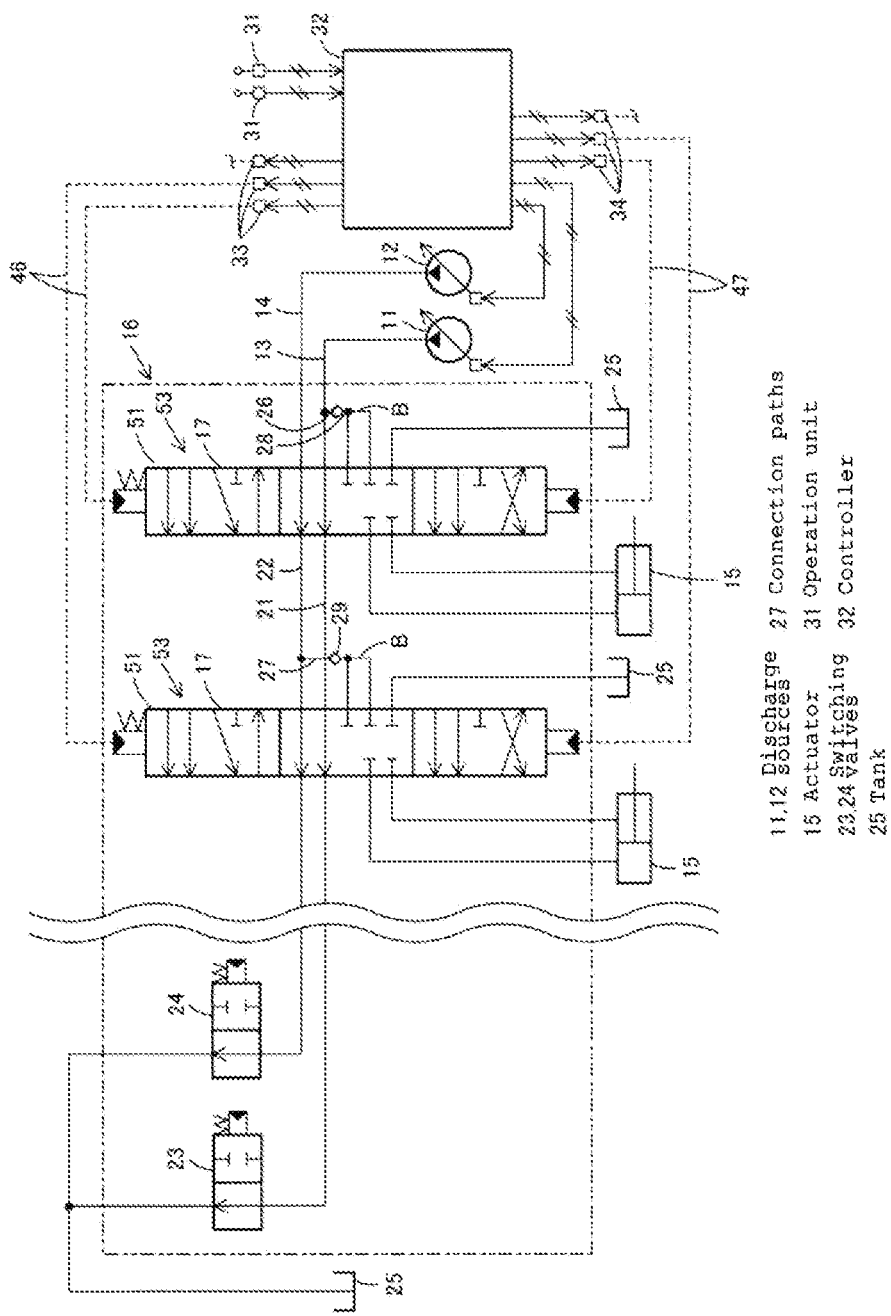

The following explains in detail the present invention, based on one embodiment shown in FIG. 1 through FIG. 3.

For a hydraulic system as a fluid pressure system used for work machinery such as a hydraulic excavator and the like, as shown in FIG. 3, the plural number of spools 17 of the control valve 16 as valve apparatus are provided respectively between the discharge lines 13, 14 of pumps 11, 12 of variable capacity type such as cam plate type and the like as a pair of discharge source for instance and the plural number of actuators 15 such as a hydraulic cylinder as a fluid pressure cylinder or a hydraulic motor as fluid pressure motor. These spools 17 configure a bridge circuit B to drive the actuator 15 by providing flow amount control and direction control of hydraulic oil that is a working fluid with respect to each actuator.

Moreover, discharge lines 13, 14 of the pumps 11, 12 are provided to be enabled to communicate with a tank 25, via parallel feeder oil paths 21, 22 that is a parallel feeder path that is provided to correspond with these pumps 11, 12 via bypass valves 23, 24 as a cutoff valve. These parallel feeder oil paths 21, 22 are provided with respect to each spool 17 so that either one side of them can communicate via connection oil paths 26, 27 that are connection paths. In the figure, for instance, for instance the right-side spool 17 belongs to pump 11 system and the left-side spool 17 belongs to the pump 12 system. Moreover, in these connection oil paths 26, 27 are provided check valves 28, 29 that stop hydraulic oil return to the parallel feeder oil paths 21, 22. Hence, the only difference between the spool 17 that belongs to pump 11 system and the spool 17 that belongs to pump 12 system is that, on the hydraulic circuit, the spool 17 that belongs to the pump 11 is connected with respect to the parallel feeder oil path 21 by connection oil path 26, and the spool 17 that belongs to pump 12 system is connected with respect to the parallel feeder oil path 22 by connection oil path 27.

Moreover, the hydraulic system is furthermore equipped with electric type operation units 31 such as an operation lever and an operation pedal and the like that are provided in the operator seat and operated by an operator; a controller 32 (on-board controller) electrically connected with the operation unit 31; and electro-magnetic proportional pressure reduction valves 33, 34 as electro-hydraulic conversion valve that is provided to correspond with each spool 17. The operation unit 31 indirectly pilot—controls spools 17 in response to the operation amount, and the operation amount of each actuator 15 (include if there is an operation or not) is converted into an electric signal and inputted into the controller 32. Then, the controller 32 calculates the requested pump discharge flow amount by the operation amount of the operation unit 31 inputted via electric signal, and based on this, the discharge amount of the pumps 11, 12, (swash plate angle of inclination), the operation of each spool 17 via electro-magnetic proportional pressure reduction valves 33, 34, and switching of bypass valves 23, 24 and the like are subject to positive control that can be controlled respectively. Hence, the control valve 16 of the hydraulic system of the embodiment does not have a center bypass circuit but is designed to be a closed center type.

The control valve 16 shown in FIG. 1 through FIG. 3 is equipped with a block shaped valve body 37 as a valve main body; spool holes 38 provided in this valve body 37; spools 17 positioned free to be displaced respectively inside of these spool holes 38; parallel feeder oil paths 21, 22 provided in valve body 37; bypass valves 23, 24; and connection oil paths 26, 27 (check valves 28, 29). That is to say, this control valve 16 is configured as a composite valve integrally equipped with the plural number of spools 17 and bypass valves 23, 24 into a valve body 37.

The valve body 37 is cast by members such as metal and the like. This valve body 37 is shaped longitudinally along the horizontal direction in this embodiment. In the valve body 37 is provided return oil paths 41, 42 and the like that are a return flow path from the actuator 15 to a tank 25. Moreover, the following explains that, regarding the control valve 16, a longitudinal direction (right and left direction in FIG. 1) is a front and back direction along a horizontal direction; a short direction (up and down direction in FIG. 1 and FIG. 2) is a right and left direction along the horizontal direction; the direction that orthogonally intersects with a longitudinal direction and a short direction are an up and down direction along the vertical direction, but not limited to those.

The return oil paths 41, 42 are provided in a specified direction with respect to valve body 37, for instance in a longitudinal linear line along the back and front direction of the valve body 37. Moreover, the return oil paths 41, 42 are provided through all spool holes 38 (in communication with all spool holes 38).

The spool holes 38 are plurally provided corresponding to the actuators 15. These spool holes 38 are provided in a specified direction with respect to the valve body 37, for instance in a longitudinal linear line along the right and left direction that intersects (orthogonally intersects) with valve body 37 and is positioned along approximately parallel to the longitudinal direction of valve body 37. In communication with these spool holes 38, oil grooves 43 that are the plural number of fluid grooves are provided in valve body 37. These oil grooves 43 are provided to configure a necessary bridge circuit B. Moreover, on both ends of spool hole 38, pilot oil rooms 44, 45 that are in communication with these spool holes 38 and feeds pilot pressure for sliding spool 17 are provided respectively on the cover cap of valve body 37. These pilot oil rooms 44, 45 are connected with electro-magnetic proportional pressure reduction valves 33, 34 via secondary pilot paths 46, 47 respectively and designed to be fed by secondary pilot pressure wherein the primary pilot pressure fed from pilot pressure source such as pilot pump and the like is converted by electro-magnetic proportional pressure reduction valve 33, 34 into the secondary pilot pressure.

Spool 17 is a shaft direction operation type, and positioned free to slide (free to displace) along a shaft direction with respect to spool holes 38. On each spool 17 is positioned electro-magnetic proportional pressure reduction valves 33, 34 on each end part. Moreover, each spool 17 is properly equipped with blocking unit 17*a* whose diameter size is relatively large and which closes oil groove 43 and a concave unit 17*b* whose diameter size is relatively small and which opens oil groove 43. Furthermore, at one end part of these spools 17, is provided a spring 51. Then, as to each spool 17, during non-operation time of the operation unit 31, secondary pilot pressure of pilot oil rooms 44, 45 becomes approximately zero, and also, due to the operation of biasing force of spring 51, it is placed in a neutral position, and during operation time of operation unit 31, via electro-magnetic proportional pressure reduction valves 33, 34 that are switched by the electric signal that is inputted from controller 32 in response to the operation, it is displaced by the secondary pilot pressure that is fed to the pilot oil rooms 44, 45, and due to this displacement, the relative position of blocking unit 17*a*, and concave unit 17*b* with respect to oil groove 43 is displaced, thereby the communication amount (open area) with oil groove 43 and parallel feeder oil paths 21, 22 or tank 25 is changed, thereby the flow amount and direction of the hydraulic oil that is fed via parallel feeder oil paths 21, 22 from pumps 11, 12 and return oil from each actuator 15 to tank 25 are designed to be controlled. That is, these spools 17 configure the bridge circuit B that controls the flow amount and the direction of the hydraulic oil that is fed to the actuator 15 in response to the operation of operation unit 31.

Then, mutually adjacently placed sections 53 are configured by these spool holes 38 and spools 17 respectively. That is, these sections 53 are provided to correspond with actuators 15 respectively (at least one for one actuator 15). Hence, for instance in case of a hydraulic excavator, section 53 is respectively provided to correspond for runs, rotations, booms, sticks, buckets, attachments and the like respectively. Moreover, for instance for booms, two section 53 can be provided. Then, each section 53 is designed such that pressure oil is fed only from one system of any of pumps 11, 12 via parallel feeder oil paths 21, 22. On the other hand, in response to the needs, among the plural number of sections 53 of the different pump systems, in this embodiment, a merging circuit 55 can be configured such that pump 11 system and pump 12 system are communicated, and hydraulic oil that were discharged from these pumps 11, 12 are merged to feed to section 53. As the merging circuit 55, for instance in case of hydraulic excavators, in order to speed up boom-up, boom speed up circuit and the like can be used to merge pressure oil that is discharged from pumps 11, 12. This merging circuit 55 is provided in valve body 37 by communicating among section 53 so that hydraulic oil that is respectively fed to the plural number of sections 53 of different pump systems is merged with any of the section 53 via oil grove 43 and spool hole 38.

Parallel feeder oil paths 21, 22 are provided in a specified direction that intersects (orthogonal intersect) with spool holes 38 with respect to valve body 37, for instance linearly along the back and front direction that is a longitudinal direction of valve body 37. That is, these parallel feeder oil paths 21, 22 are positioned approximately parallel with respect to return oil paths 41, 42. These parallel feeder oil paths 21, 22 are approximately mutually parallel positioned at approximately central position (approximately central positioned in the spool 17) in a right and left direction of valve body 37 for instance. That is, these parallel feeder oil paths 21, 22 are positioned at the center bypass circuit in the control valve of the open center type. Furthermore, these parallel feeder oil paths 21, 22 are provided through all spool holes 38 (communicating with all spool holes 38). Moreover, these parallel feeder oil paths 21, 22 are designed to be a wide oil path with respect to the outer diameter of spools 17 (oil path with clearance in the surrounding of spool 17). Because of this, these parallel feeder oil paths 21, 22 are configured so as not to be blocked with respect to the displacement of spool 17 within spool hole 38. That is to say, these parallel feeder oil paths 21, 22, even in case any of spool 17 is displaced, is configured so that pressure oil feeding is not prevented with respect to section 53 positioned in the downstream side of section 53 with the spool 17. Hence, in the hydraulic system of the embodiment, pressure oil is designed to be fed in parallel with each section 53 (parallel).

Bypass valves 23, 24 are for instance positioned at the rear end which is one end of the longitudinal direction of valve body 37. These bypass valves 23, 24 are provided at the end edge (most downstream) of pump flow path, and the opening and closing is controlled by controller 32, and it is opened during neutral time (non-operation time) of operation unit 31, and the hydraulic oil that is discharged from pumps 11, 12 is bled off from parallel feeder oil paths 21, 22 to tank 25, and during the operation time of operation unit 31, it is switched to be closed. Hence, bypass valves 23, 24 are designed such that as long as the operation unit 31 is operated, a situation does not occur in which at the downstream side of the pump flow path, pressure oil escapes to tank 25 and sufficient hydraulic pressure is not fed to actuator 15. Another word, the pump flow path of hydraulic pressure system of the embodiment has two functions in which one function is to feed the pressure oil in parallel to each section 53 and another is to return pressure oil to tank 25 during the non-operation time of operation unit 31 (bleed off function)

Connection oil paths 26,27 are provided in a specified direction that intersects (orthogonal intersection) with respect to parallel feeder oil paths 21, 22, for instance, along the back and front direction of valve body 37. For instance, in FIG. 2 is shown a connection oil path 26 and this connection oil path 26 is in communication with the plural number of (a pair) oil grooves 43, 43, and between these oil grooves 43, 43 are provided a check valve 28. That is, section 53 shown in FIG. 2 can be used as pump 11 system section. Not shown in Figure, the connection oil path 27 (pump 12 system) have the same configuration.

Next the embodiment operations shown in figures are explained.

During the non-operation time of operation unit 31 (when all spool 17 are neutral), bypass valves 23, 24 are open and pressure oil that is discharged from pumps 11, 12 and fed via parallel feeder oil paths 21, 22 is bypassed to tank 25.

On the other hand, when the operation unit 31 is operated, the controller 32, by which the electric signal that responds to the operation content is input, outputs the electric signal that was generated in response to the input electric signal, thereby controls the discharge amount of pumps 11, 12 and also is switched to close bypass valves 23, 24 that is provided at the most downstream of the pump flow path, thus the pressure of pump flow path is properly raised, and also, secondary pilot pressure that becomes necessary from pilot pressure source is fed and spool 17 is displaced, thereby pressure oil is fed and discharged via parallel feeder oil paths 21, 22 and connection oil paths 26, 27 from either any of system of pumps 11, 12 where the section 53 belongs in which the section 53 corresponds to the actuator 15 with respect to the actuator 15 that responded to the operation, thus the actuator 15 is properly operated.

Moreover, for instance in case speed increase such as boom raising operation is necessary, pressure oil that is fed from both pumps 11, 12 via merging circuit 55 is merged, to feed to section 53.

Next the operation effect of the above embodiment is listed.

Parallel feeder oil paths 21, 22 that are connected respectively to pumps 11, 12 and not cut off by spool 17 displacement is provided linearly through all spool holes 38 (section 53) in valve body 37, and for every section 53, any one side of these parallel feeder oil paths 21, 22 is connected to the bridge circuit B of internal spool 17 by connection oil paths 26, 27, thereby the center bypass circuit is eliminated that is provided in the control valve for the conventionally negative control, and in the space where the center bypass circuit is provided, parallel feeder oil paths 21, 22 are positioned in a simple shape. Hence, cast shape of valve body 37 can be simplified and made smaller.

Any of parallel feeder oil paths 21, 22 only can be structured to communicate with bridge circuit B by connection oil paths 26, 27, thereby regardless of whether or not each section 53 (actuator 15) belongs to any of pumps 11, 12 systems, positioning of section 53 can be freely done within valve body 37.

That is, since the plural number of (all) sections 53 are penetrated, and parallel feeder oil paths 21, 22 are provided, it is not necessary to position by dividing into pump 11 system section 53 and pump 12 system section 53 as in the conventional ones and by properly providing the connection oil paths 26, 27, for instance spool 17 for boom that belongs to pump 11 and spool 17 for boom used to merge pressure oil on pump 12 side during boom raising operation time and the like, pump 11 system section 53 and pump 12 system section 53 can be placed adjacently and the like; regardless of whether or not each section 53 belongs to any of pumps 11, 12 system, the degree of freedom of positioning of section 53 improves.

Because of this, merging circuit 55 that enables merging the plural number of sections 53, 53 that belongs to the mutually different pumps 11, 12 systems can be provided to be short using the minimum length (length only between adjacent sections 53, 53), and even by this also, cast shape of valve body 37 can be simplified and made smaller.

As a result, the decrease of oil path in the structure of the valve body 37 of control valve 16, and simplification of oil path shape was enabled, and making valve body 37 of control valve 16 smaller and structure simplifications is enabled. Hence, control valve 16 can be produced at lower cost.

Moreover, it is designed such that bypass valves 23, 24 can be switched to communicate with parallel feeder oil paths 21, 22 and tank 25 during non-operation time of operation unit 31 and are provided in valve body 37 to correspond with of parallel feeder oil paths 21, 22 respectively, thereby during operation time of operation unit 31, the communication of parallel feeder oil paths 21, 22 and tank 25 is cut off by bypass valves 23, 24, and the pressure of hydraulic oil of pump flow path is properly raised, and by spool 17 that is displaced responding to the operation, pressure oil is fed for sure for the actuator 15, thus the actuator 15 can be properly operated.

Then, responding to the operation of the operation unit 31, discharge amount of hydraulic oil from pumps 11, 12 and the operation of spool 17 of control valve 16 described above is controlled by controller 32, thereby hydraulic system that operates the plural number of actuators 15 can be realized as a smaller type and cheaply.

Moreover, In case the control valve 16 described above is actually adopted for a hydraulic excavator, regarding the section 53, in order to assure advancing linearly on during run operation, when the well-known run linear-advancing valve is used (valve that distributes only pressure oil from one side of pumps 11, 12 during run to run motors that are two actuators 15, 15, and to eliminate the differences of right and left of the amount of pressure oil that is fed to 2 run motors on right and left), this run linear—advance valve is positioned at the upper most stream of the pump flow path of any of pumps 11, 12, and section 53 for run is desired to be positioned on the downstream side of the run linear-advance valve.

In the embodiment described above, the pumps to become discharge sources can be three or more. In this case, by providing the parallel feeder paths that correspond with the number of these pumps in the valve body, the same operation effect can be produced.

UTILIZATION POSSIBILITY IN INDUSTRY

The present invention can be utilized by business people involved in production of control valves used for hydraulic system, and work machinery using this control valve.

EXPLANATION OF SYMBOLS

B: bridge circuit
11, 12: pumps as discharge source
15: actuator
16: control valve as a valve apparatus
17: spool
21, 22: parallel feeder oil paths that are parallel feeder paths
23,24: bypass valve as a switching valve
25: tank
26, 27: connection oil paths as connection paths
31: operation unit
32: controller
37: valve body as valve main body
38: spool holes
53: section

The invention claimed is:

1. A valve apparatus that feeds working fluid that is discharged from a discharge source of a plural number of systems to a plural number of actuators in response to operation of an operation unit, the valve apparatus comprising:
 a valve main body,
 sections equipped with a plurality of spool holes multiply provided in the valve main body in which the spool holes correspond with each actuator, and, spools that are provided free to be displaced inside these spool holes and that configures the bridge circuit that controls the flow amount and the direction of working fluid that is fed to actuators in response to the operation of operation unit,
 parallel feeder paths that are connected to the discharge source respectively and provided linearly through all of the plural number of spool holes in the valve main body, and not cut off due to spool displacement, and
 connection paths in which for each section, any of one side of these parallel feeder paths is connected to the bridge circuit of the internal spool.

2. The valve apparatus according to claim 1 wherein a switch valve system is provided in the valve main body and corresponds to each parallel feeder path such that parallel feeder path and tank are enabled to communicate during non-operation time of the operation unit, and also the communication of the parallel feeder paths and tanks are cut off during the operation of the operation unit.

3. A fluid pressure system comprising:
 discharge sources of a plural number of systems;
 an operation unit;
 a plural number of actuators;
 a valve apparatus according to claim 1; and
 a controller that controls at least the discharge amount of working fluid from the discharge source in response to the operation of operation unit and the operation of spools of the valve apparatus.

4. The valve apparatus according to claim 1, wherein:
 the discharge source includes a first pump and a second pump;
 the parallel feeder paths include a first feeder path belonging to the first pump and a second feeder path belonging to the second pump;
 the connection paths include a first connection path connecting to the first feeder path and a second connection path connecting to the second feeder path; and
 for each section, any one of the connection paths is connected to the bridge circuit of the internal spool.

5. The valve apparatus according to claim 1, further comprising a merging circuit configured such that the discharge source of the plural number of systems are merged to feed any of the sections of the valve apparatus.

6. The valve apparatus according to claim 1, the connection paths further comprising check valves that stop hydraulic oil return to the parallel feeder paths.

* * * * *